United States Patent
Belapurkar et al.

(10) Patent No.: US 10,825,344 B2
(45) Date of Patent: Nov. 3, 2020

(54) SYSTEM AND METHOD FOR FORMING A FLEET AND POSITIONING VEHICLES IN THE FLEET

(71) Applicant: GM GLOBAL TECHNOLOGY OPERATIONS LLC, Detroit, MI (US)

(72) Inventors: Rohit Belapurkar, Troy, MI (US); Nathan A. Wilmot, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 440 days.

(21) Appl. No.: 15/885,937

(22) Filed: Feb. 1, 2018

(65) Prior Publication Data

US 2019/0236959 A1 Aug. 1, 2019

(51) Int. Cl.
*G08G 1/00* (2006.01)
*G06Q 20/32* (2012.01)

(52) U.S. Cl.
CPC .......... *G08G 1/20* (2013.01); *G06Q 20/325* (2013.01); *G08G 1/202* (2013.01); *G08G 1/22* (2013.01)

(58) Field of Classification Search
None
See application file for complete search history.

(56) References Cited

U.S. PATENT DOCUMENTS

| | | | | |
|---|---|---|---|---|
| 9,141,112 B1 * | 9/2015 | Loo | | G08G 1/22 |
| 9,665,102 B2 * | 5/2017 | Switkes | | G01C 22/00 |
| 9,852,637 B2 * | 12/2017 | Hayee | | G08G 1/22 |
| 2013/0079953 A1 * | 3/2013 | Kumabe | | G08G 1/22 |
| | | | | 701/2 |
| 2014/0302774 A1 * | 10/2014 | Burke | | H04W 4/08 |
| | | | | 455/3.05 |
| 2015/0336502 A1 * | 11/2015 | Hillis | | G06F 3/017 |
| | | | | 701/23 |
| 2016/0163200 A1 * | 6/2016 | He | | G08G 1/22 |
| | | | | 701/117 |
| 2016/0267795 A1 * | 9/2016 | Miyazawa | | B60W 30/12 |
| 2016/0267796 A1 * | 9/2016 | Hiroma | | H04L 51/20 |
| 2018/0018605 A1 * | 1/2018 | Light-Holets | | G06Q 20/405 |
| 2018/0039265 A1 * | 2/2018 | Lawler | | G05D 1/0027 |
| 2018/0113448 A1 * | 4/2018 | Nagda | | H04W 4/46 |
| 2019/0220037 A1 * | 7/2019 | Vladimerou | | G05D 1/0088 |

* cited by examiner

*Primary Examiner* — Richard M Camby
(74) *Attorney, Agent, or Firm* — Lorenz & Kopf LLP

(57) ABSTRACT

Methods and systems for forming a fleet and positioning vehicles in the fleet are disclosed. The system comprises a data transmission interface and a data processing unit. The data processing unit sends data to and receives data from the data transmission interface. The data processing unit determines an itinerary of each of a group of vehicles requesting to join a fleet. The data processing unit compares the itinerary of all vehicles of the group of vehicles. The data processing unit determines a second vehicle to form a fleet with a first vehicle from the group of vehicles. The data transmission interface communicates to the first vehicle a proposal to form a fleet with the second vehicle. The data processing unit determines if the first vehicle accepts the proposal, and if yes, determines instructions for the first vehicle how to join the fleet.

20 Claims, 12 Drawing Sheets

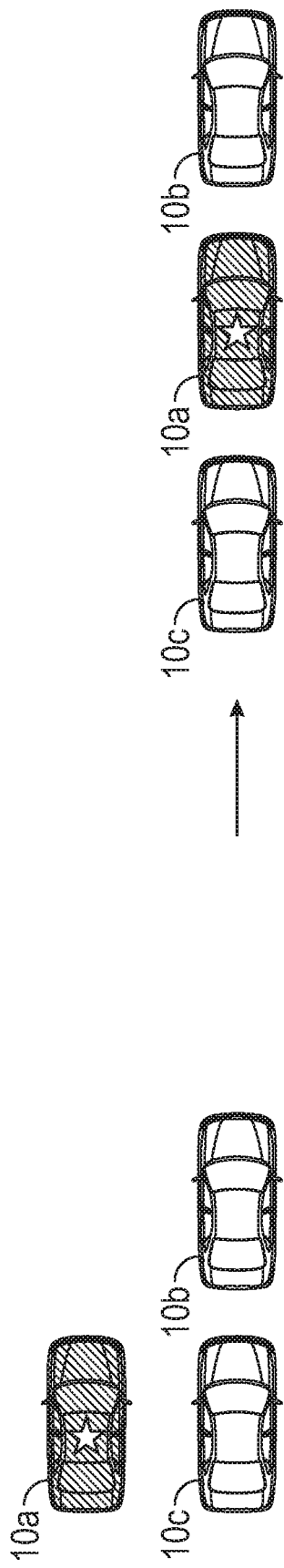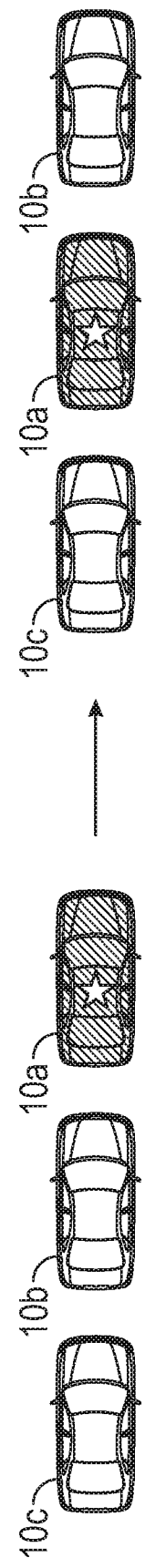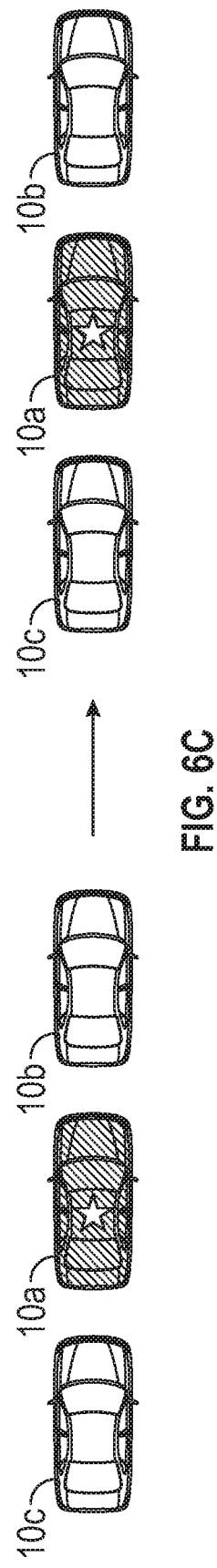

SYSTEM AND METHOD FOR FORMING A FLEET AND POSITIONING VEHICLES IN THE FLEET

TECHNICAL FIELD

The technical field generally relates to autonomous vehicles, and more particularly relates to systems and methods for forming a fleet and positioning vehicles in the fleet.

INTRODUCTION

An autonomous vehicle is a vehicle that is capable of sensing its environment and navigating with little or no user input. An autonomous vehicle senses its environment using one or more sensing devices such as radar, LIDAR, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

In this regard, there is a potential for connecting autonomous vehicles to each other and to form a fleet. However, the fleet forming process is a complex process as users of vehicles are not equally motivated to form a fleet as it depends on several circumstances whether the individual user will benefit from being member of a fleet.

Accordingly, it is desirable to provide a system for forming a fleet and positioning vehicles in the fleet in a coordinated way. Furthermore, other desirable features and characteristics of the present invention will become apparent from the subsequent detailed description and the appended claims, taken in conjunction with the accompanying drawings and the foregoing technical field and background.

SUMMARY

A system for forming a fleet and positioning vehicles in the fleet is provided. In one embodiment, the system comprises a data transmission interface and a data processing unit. The data processing unit is configured to send data to and receive data from the data transmission interface. The data processing unit is configured to determine an itinerary of each vehicle of a group of vehicles having initiated a request to join or form a connected autonomous vehicle fleet. The data processing unit is configured to compare the itinerary and/or value based travel criteria of all vehicles of the group of vehicles. The data processing unit is configured to determine a second vehicle to form a fleet with a first vehicle from the group of vehicles. The data transmission interface is configured to communicate to the first vehicle a proposal to form a fleet with the second vehicle. The data processing unit is configured to determine if the first vehicle accepts the proposal, and if yes, then determine instructions for the first vehicle how to join the fleet, i.e., how to form a fleet with the second vehicle. The data transmission interface is configured to communicate the instructions how to join the fleet to the first vehicle. The fleet can also be referred to as a platoon.

A fleet of autonomously connected vehicles has been shown to provide the opportunity for smaller vehicle separation distance, mutually beneficial aerodynamic drag reduction, and therefore increased operating efficiency and less overall energy usage. Furthermore, the benefits of forming an autonomously connected fleet may not be equivalent for all members of the fleet. The system is shown for forming a fleet and positioning vehicles in the fleet in a coordinated way by providing a platform for offering incentives/compensation to equally distribute the energy efficiency benefit amongst all fleet members to provide for close to optimal benefit. In addition, a mechanism and methodology is identified to recognize and compensate users of the connected autonomous vehicles according to relative benefit received from coordination. Furthermore, a methodology is identified for users of the connected autonomous vehicles to set value based criteria in order to best manage their participation in the connected autonomous fleet. An itinerary in the meaning of this description may be a route of a vehicle and may be defined by the start time, (predicted) time of arrival, start point (coordinates, for example), end point, route, distance, etc. Fleet formation may be economically beneficial for any distances and even for short distances like few miles or even shorter than one mile.

In various embodiments, the data processing unit is configured to determine the second vehicle based on a same or partially same itinerary within a predetermined timeframe.

In various embodiments, the data processing unit is configured to determine a starting point for the first vehicle where to join the fleet and to determine a time for the first vehicle when to join the fleet. For example, this is done for determining instructions for the first vehicle how to join the fleet.

In various embodiments, the data processing unit is configured to determine a position for the first vehicle in the fleet. For example, this is done for determining instructions for the first vehicle how to join the fleet and where to position itself within the fleet. The first vehicle is referred to as one of a pool of vehicles to join or to form a fleet. The wording "first" or "second" are not related to a position in the fleet, for example a leading vehicle, neither it is related to a vehicle which initiates as first vehicle or second vehicle the willingness to join a fleet.

In various embodiments, the data processing unit is configured to determine the number of vehicles in the fleet and to determine a position for each vehicle in the fleet. The data transmission interface is configured to communicate to each vehicle its position in the fleet. In an example, the data transmission interface is configured to communicate among the data processing units of each vehicle in the fleet to achieve unanimous decision on the fleet configuration.

In various embodiments, a supervisory unit may be provided for managing the fleet and for carrying out at least some of the functions described herein. For example, in a first embodiment, the data processing unit of one of the fleet members may be selected to meet the functions of the supervisory unit. In this case, the data processing unit of each fleet member may vote to decide which fleet member's data processing unit will act as a supervisory unit and act as a group leader for the entire fleet. For example, this is further done for determining instructions for the first vehicle how to join the fleet. In a second embodiment, a global external system may act as the supervisory unit and may receive information from the (potential) fleet members and provide instructions to the individual fleet members for fleet formation and fleet management. Such a supervisory unit may be referred to as intelligent traffic management system. In another embodiment, no specific supervisory unit is chosen and the data processing units of the (potential) fleet members are in direct contact to exchange information for fleet formation and fleet management.

In various embodiments, the data processing unit is configured to determine an initial range and/or energy efficiency of the first vehicle without joining the fleet and to calculate a new range and/or a new energy efficiency of the first vehicle for different positions of the first vehicle in the fleet. In addition, the data processing unit is configured to calculate a new range and/or a new energy efficiency for each one of the other vehicles for different positions of the first vehicle in the fleet and to determine if the initial range and/or initial energy efficiency of the first vehicle is sufficient for reaching a destination of its itinerary, and if not, then indicate a position of the first vehicle in the fleet with less energy consumption than without joining the fleet in order to increase the range and/or the energy efficiency of the first vehicle. For example, this is done for determining a position for the first vehicle in the fleet.

In various embodiments, the data processing unit is configured to request an amount of compensation from the first vehicle in order to be positioned at the indicated position. The data transmission interface is configured to communicate a compensation offer to at least one of the other vehicles at a position with higher energy consumption. The data processing unit is configured to determine if the at least one vehicle of the other vehicles accepts the offer, and if yes, the data processing unit is configured to then initiate a compensation from the first vehicle to the at least one of the other vehicles based on the compensation offer. In an example, the amount of compensation can be referred to as an incentive which is provided to one of the other vehicles by the data processing unit.

In various embodiments, if the at least one vehicle of the other vehicles does not accept the offer, the data processing unit is configured to then determine a third vehicle. The third vehicle may have an itinerary different from the itinerary of the first vehicle or the same itinerary. The data transmission interface is configured to then communicate to the first vehicle a proposal to form a fleet with the third vehicle and to communicate to the third vehicle a proposal to form a fleet with the first vehicle. The data processing unit is configured to request an amount of compensation from the first vehicle in order to form a fleet with the third vehicle, and to determine if the third vehicle accepts the offer, and if yes, then determine instructions for the first vehicle and the third vehicle how to form the fleet. The data transmission interface is configured to communicate the instructions how to form the fleet to the first vehicle and the third vehicle.

In various embodiments, if the initial range and/or energy efficiency of the first vehicle is sufficient for reaching the destination of its itinerary, the data processing unit is configured to calculate an individual energy consumption level for each vehicle for different positions in the fleet and to calculate a fleet average consumption level based on the individual energy consumption level for each vehicle. Further, the data processing unit is configured to select the position of each vehicle based on the individual energy consumption level in relation to the fleet average consumption level and position and compensate/charge members of the fleet relative to their respective placement and benefit relative to the other members of the fleet.

In various embodiments, the data processing unit is configured to receive destination location, required arrival time, and/or vehicle profile for each vehicle and compare these data of each vehicle with each other. For example, this is done for comparing the itinerary of all vehicles of the group of vehicles.

A method for forming a fleet and positioning vehicles in the fleet is provided. In one embodiment, the method comprises determining an itinerary of each of a group of vehicles having initiated a request to join a fleet. In addition, the method comprises comparing the itinerary of all vehicles of the group of vehicles. Then, determining a second vehicle to form a fleet with a first vehicle from the group of vehicles. In addition, the method comprises communicating to the first vehicle a proposal to form a fleet with the second vehicle and determining if the first vehicle accepts the proposal, and if yes, then determining instructions for the first vehicle how to join the fleet. Afterwards, the method comprises communicating the instructions how to join the fleet to the first vehicle.

It is noted that in various embodiments, the method contains steps which correspond to the functions of one or more of the various embodiments of the system described above.

BRIEF DESCRIPTION OF THE DRAWINGS

The exemplary embodiments will hereinafter be described in conjunction with the following drawing figures, wherein like numerals denote like elements, and wherein:

FIGS. 6A-C illustrate examples of vehicles forming a fleet;

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
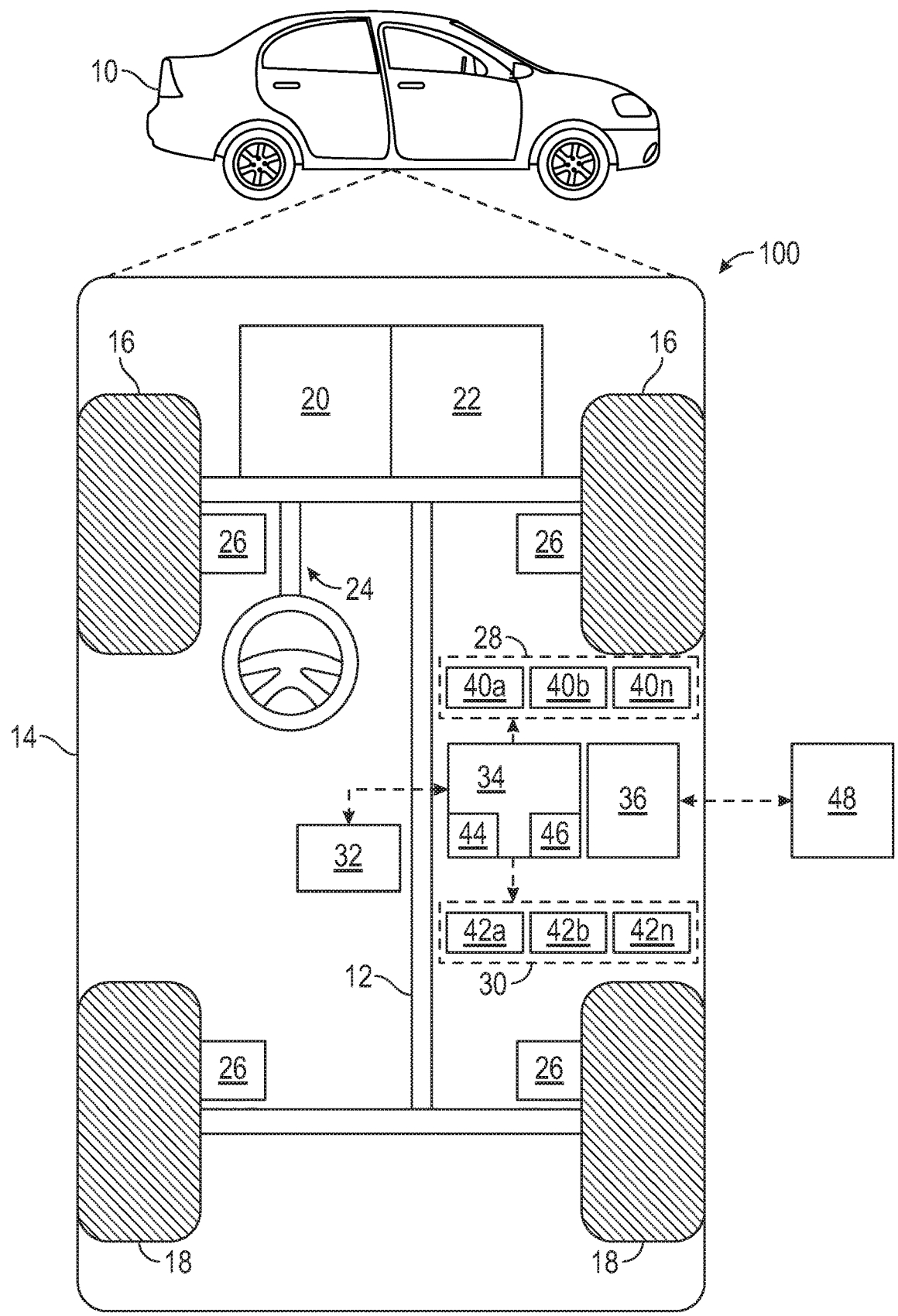
FIG. 1 is a functional block diagram of an autonomous vehicle in accordance with an embodiment.

With reference to FIG. 1, a vehicle 10 is shown in accordance with various embodiments. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle. The autonomous vehicle 10 is, for example, a vehicle that is automatically controlled to carry passengers and/or cargo from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

Figure 3:
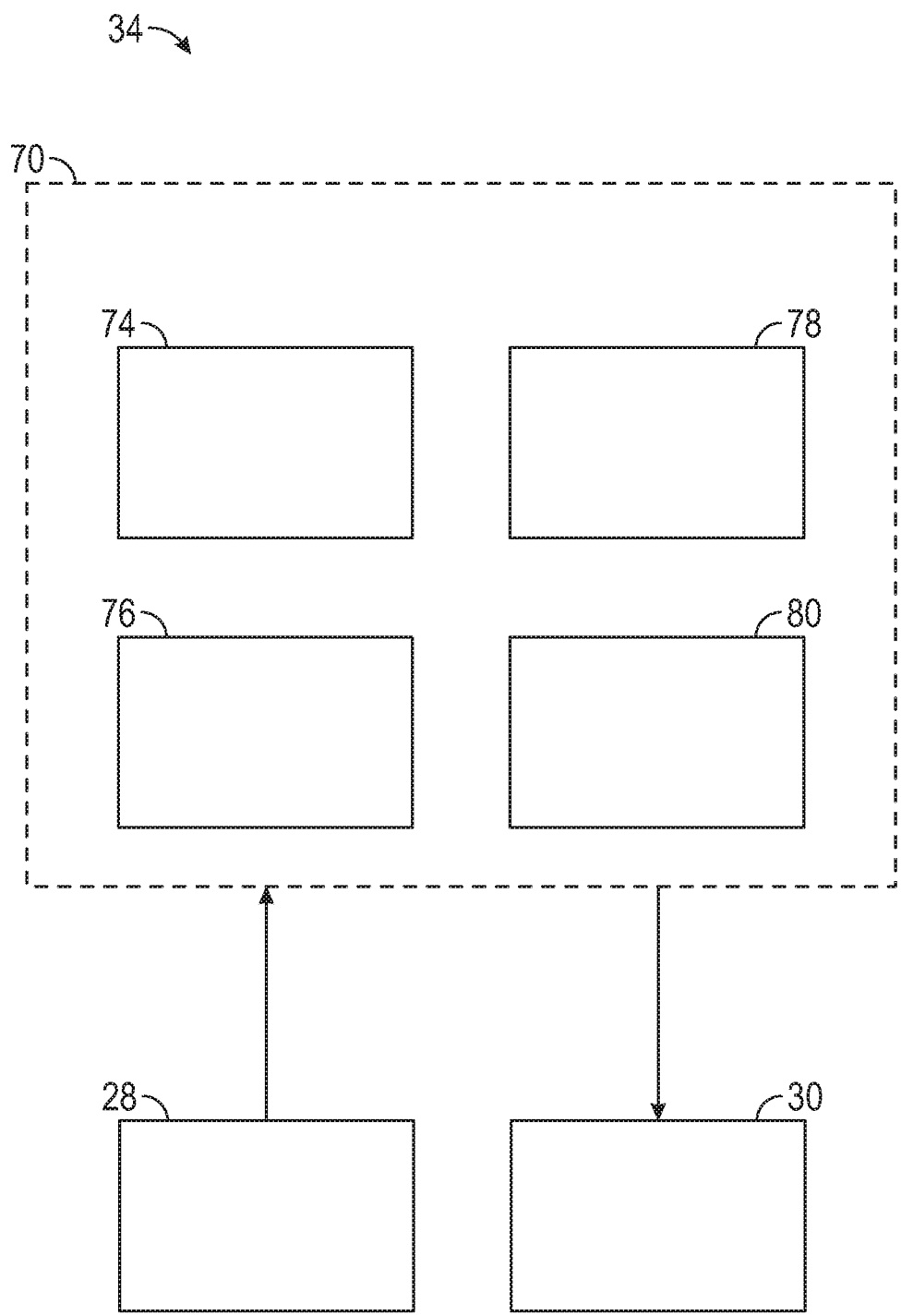
FIG. 3 is a functional block diagram illustrating an autonomous driving system, in accordance with an embodiment.

In various embodiments, the data storage device 32 includes a map module which provides map data to the controller 34 and the autonomous driving system 70 (FIG. 3). In various embodiments, the map module accesses locally stored map data and/or map data received from a remote map data provider. For example, the map data provider provides map data via the communication system 36.

The sensor system 28 includes one or more sensing devices 40a-40n that sense observable conditions of the exterior environment and/or the interior environment of the autonomous vehicle 10. The sensing devices 40a-40n can include, but are not limited to, radars, LIDARs, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
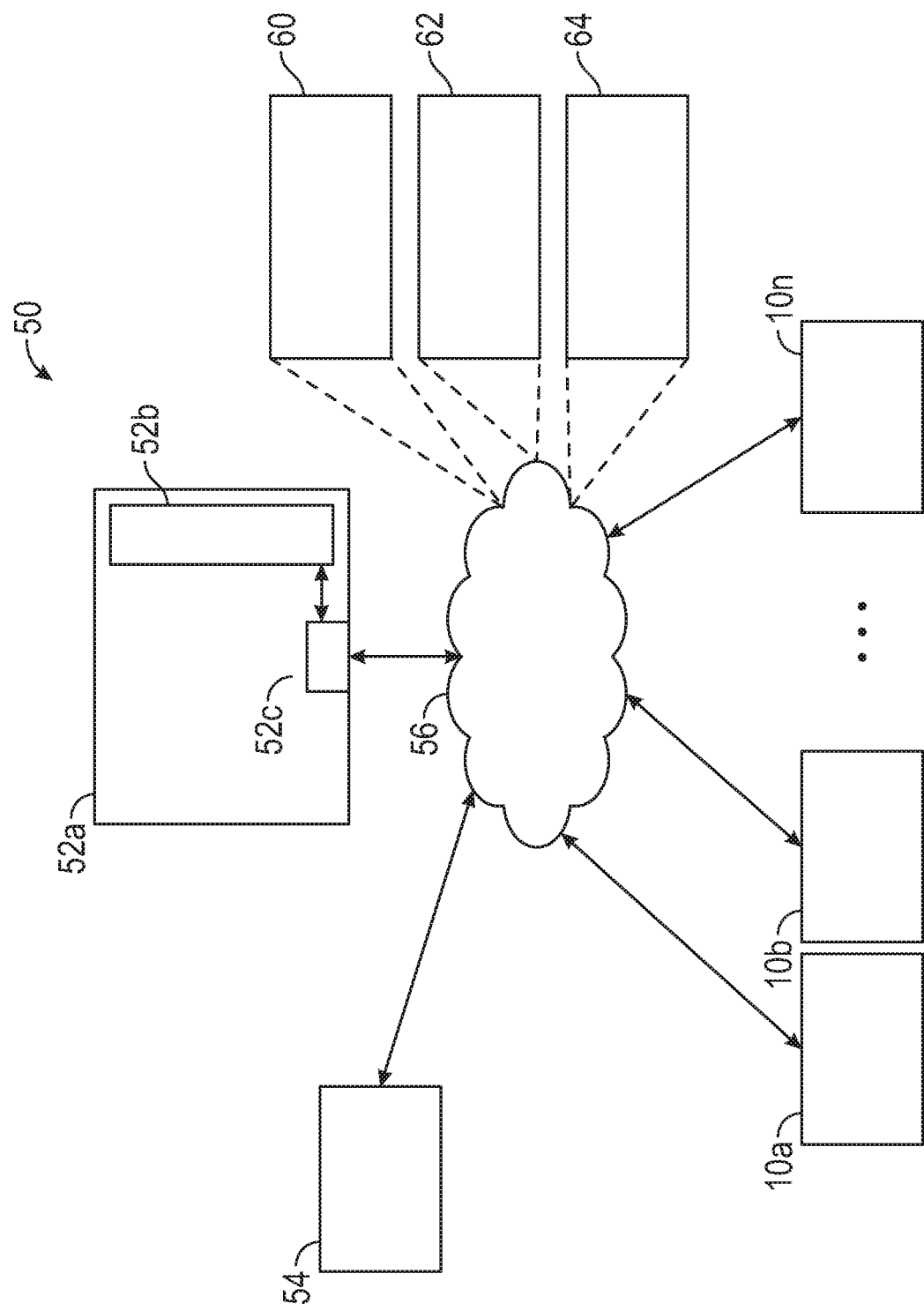
FIG. 2 is a functional block diagram illustrating a fleet forming system with one or more autonomous vehicles of FIG. 1, in accordance with an embodiment.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down.

The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In an example, the autonomous driving system comprises an electronic brake control module (EBCM) for applying the brake. With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with a fleet forming system. FIG. 2 illustrates an exemplary embodiment of an operating environment shown generally at 50 that includes a fleet forming system 52 that is associated with one or more autonomous vehicles 10*a*-10*n* as described with regard to FIG. 1. In various embodiments, the operating environment 50 further includes one or more user devices 54 that communicate with the autonomous vehicle 10 and/or the fleet forming system 52 via a communication network 56. The fleet forming system 52 may also be referred to as a fleet management system managing the overall fleet operation, e.g., managing the requests of the different vehicles to join a fleet.

The fleet forming system 52 is a system for forming a fleet and positioning vehicles in the fleet. The fleet forming system 52 comprises a data transmission interface 52*a* and a data processing unit 52*b*. The data processing unit 52*b* is configured to carry out functions and steps of the fleet forming system 52 and send data to and receive data from the data transmission interface 52*a*. The data transmission interface is configured to communicate with the vehicle via the communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10*a*-10*n*. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The fleet forming system 52 includes one or more back-end server systems, which may be cloud-based, network-based, or resident at the particular campus or geographical location serviced by the fleet forming system 52. The fleet forming system 52 can be manned by a live advisor, or an automated advisor, or a combination of both. The fleet forming system 52 can communicate with the user devices 54 and the autonomous vehicles 10a-10n to schedule rides, dispatch autonomous vehicles 10a-10n, and the like. In various embodiments, the fleet forming system 52 stores account information such as subscriber authentication information, vehicle profile identifiers, profile records, behavioral patterns, and other pertinent subscriber information.

In accordance with a typical use case workflow, a registered user of the fleet forming system 52 can create a ride request via the user device 54. The ride request will typically indicate the passenger's desired pickup location (or current GPS location), the desired destination location (which may identify a predefined vehicle stop and/or a user-specified passenger destination), and a pickup time. The fleet forming system 52 receives the ride request, processes the request, and dispatches a selected one of the autonomous vehicles 10a-10n (when and if one is available) to pick up the passenger at the designated pickup location and at the appropriate time. The fleet forming system 52 can also generate and send a suitably configured confirmation message or notification to the user device 54, to let the passenger know that a vehicle is on the way. In the context of the ride request, the registered user may also initiate a request to form a fleet with other vehicles. The fleet forming system 52 receives the request from the registered user and manages the fleet forming process with other vehicles comprising functions like analyzing itineraries of vehicles sharing the same or partially same itinerary.

As can be appreciated, the subject matter disclosed herein provides certain enhanced features and functionality to what may be considered as a standard or baseline autonomous vehicle 10 and/or a fleet forming system 52. To this end, an autonomous vehicle and fleet forming system can be modified, enhanced, or otherwise supplemented to provide the additional features described in more detail below.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, LIDARs, radars, and/or any number of other types of sensors. The sensor fusion system 74 may also be referred to as a computer vision system, as it enables visualization of input from several sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

The vehicle control system 80 is configured to communicate a vehicle control output to the actuator system 30. In an exemplary embodiment, the actuators 42 include a steering control, a shifter control, an accelerator or throttle control, and a brake control. The steering control may, for example, control a steering system 24 as illustrated in FIG. 1. The shifter control may, for example, control a transmission system 22 as illustrated in FIG. 1. The throttle control may, for example, control a propulsion system 20 as illustrated in FIG. 1. The brake control may, for example, control wheel brake system 26 as illustrated in FIG. 1.

With reference now to FIG. 2, the fleet forming system comprises a data transmission interface 52a and a data processing unit 52b. The data processing unit 52b is configured to send data to and receive data from the data transmission interface 52a. The data processing unit is configured to determine an itinerary of each vehicle of a group of vehicles 10a-10n having initiated a request to join a fleet. The data processing unit 52b is configured to compare the itinerary of all vehicles 10a-10n of the group of vehicles. The data processing unit 52b is configured to determine a second vehicle 10b to form a fleet with a first vehicle 10a from the group of vehicles. The data transmission interface 52a is configured to communicate to the first vehicle 10a a proposal to form a fleet with the second vehicle 10b. The data processing unit 52b is configured to determine if the first vehicle 10a accepts the proposal, and if yes, then determine instructions for the first vehicle 10a how to join the fleet. The data transmission interface 52a is configured to communicate the instructions how to join the fleet to the first vehicle 10a.

As illustrated in FIG. 2, the data transmission interface 52a is configured to send data to the group of vehicles 10a-10n and receive data from the group of vehicles 10a-

10n via the communication network 56. The user interface 54 as described above is arranged either in the vehicle 10 (e.g., in a monitor display of the vehicle) and/or is a smartphone. In addition, the user interface 54 can be facilitated by an application installed on, for example, the monitor display and/or the smartphone.

In various embodiments, the data processing unit 52b is configured to determine the second vehicle 10b based on a same or partially same itinerary within a predetermined timeframe.

In various embodiments, the data processing unit 52b is configured to determine a starting point for the first vehicle 10a where to join the fleet and to determine a time for the first vehicle 10a when to join the fleet. For example, this is done for determining instructions for the first vehicle 10a on how to join the fleet.

In various embodiments, the data processing unit 52b is configured to determine a position for the first vehicle 10a in the fleet. For example, this is done for determining instructions for the first vehicle 10a how to join the fleet.

In various embodiments, the data processing unit 52b is configured to determine the number of vehicles in the fleet and to determine a position for each vehicle in the fleet. The data transmission interface 52a is configured to communicate, to each vehicle, its position in the fleet. For example, this is done for further determining instructions for the first vehicle 10a how to join the fleet.

In various embodiments, the data processing unit 52b is configured to determine an initial range and/or an initial energy efficiency of the first vehicle without joining the fleet and to calculate a new range and/or a new energy efficiency of the first vehicle for different positions of the first vehicle in the fleet. In addition, the data processing unit 52b is configured to calculate a new range and/or a new energy efficiency for each one of the other vehicles for different positions of the first vehicle 10a in the fleet and to determine if the initial range and/or the initial energy efficiency of the first vehicle 10a is sufficient for reaching a destination of its itinerary, and if not, then indicate a position of the first vehicle 10a in the fleet with less energy consumption than without joining the fleet in order to increase the range and/or energy efficiency of the first vehicle 10a. A position with less energy consumption can be a position between two vehicles in the fleet because of the favorable aerodynamic conditions of this position. In contrary, the first and the last position may be less favorable in terms of aerodynamic conditions and therefore positions in the fleet where vehicles consume more energy. In addition, the system 52 can determine the type of vehicles in the fleet (e.g., a car or a truck). This may also have an influence on the positioning of the vehicles in the fleet as a vehicle positioned behind a truck gets a position with even better aerodynamic conditions (see FIG. 7).

The fleet forming system 52 is configured to send instructions, (e.g., position in the fleet, vehicle speed, time for joining the fleet, etc.) to the autonomous driving system (ADS) 70 of each vehicle joining the fleet. As described with reference to FIG. 3, the ADS 70 controls each vehicle willing to join the fleet based on the received instructions from the fleet forming system 52. Alternatively, the fleet forming system 52 directly accesses the ADS 70 to control each individual vehicle to form the fleet.

In various embodiments, (see FIG. 7 and FIG. 8) the data processing unit 52b is configured to request an amount of compensation from the first vehicle 10a in order to be positioned at the indicated position. In another example, vehicle 10a can receive compensation or pay an incentive based on its contribution to entire fleet efficiency. The data transmission interface 52a is configured to communicate a compensation offer to at least one of the other vehicles at a position with higher energy consumption. The data processing unit 52b is configured to determine if the at least one vehicle of the other vehicles accepts the offer, and if yes, the data processing unit 52b is configured to then initiate a compensation from the first vehicle 10a to the at least one of the other vehicles based on the compensation offer. By this, the data processing unit 52b informs vehicle 10a if it receives an incentive or pays compensation and supports exchanging it among all fleet members. The energy efficiency benefit may not be uniform across all vehicles in the fleet. A fleet energy efficiency optimization may be detrimental for an individual vehicle energy efficiency. This has the effect that the system 52 monetizes and incentives collaborative energy efficiency and range management by compensating vehicles that don't realize the maximum benefit of driving in the fleet. In a further example, the compensation offer is based on energy efficiency, payload optimization, route planning and travel time. In other words, the compensation method can be managed in multiple ways. First, a compensation is offered from a vehicle (e.g. vehicle 10a) to another vehicle (e.g., one of the other vehicles). The amount of compensation or incentive may be based on pre-populated criteria (e.g., value of energy, time, location, etc.). The system assumes and/or calculates the pre-populated criteria based on individual itinerary, preferences, calendar, etc. of each vehicle. The value of energy may be a function of multiple factors (pure cost of energy, driving range requirements, time to charge/refuel, location of charge/refuel options, etc.).

In various embodiments, if the at least one vehicle of the other vehicles does not accept the offer, the data processing unit 52b is configured to then determine a third vehicle 10c with an itinerary different from the itinerary of the first vehicle 10a. The data transmission interface 52a is configured to then communicate to the first vehicle 10a a proposal to form a fleet with the third vehicle 10c and to communicate to the third vehicle 10c a proposal to form a fleet with the first vehicle 10a. The data processing unit 52b is configured to request an amount of compensation from the first vehicle 10a in order to form a fleet with the third vehicle 10c, and to determine if the third vehicle 10c accepts the offer, and if yes, then determine instructions for the first vehicle 10a and the third vehicle 10c how to form the fleet. The data transmission interface 52a is configured to communicate the instructions how to form the fleet to the first vehicle 10a and the third vehicle 10c. In other words, the third vehicle 10c may be paid a compensation for accepting to detour for forming a fleet with the first vehicle.

In various embodiments, if the initial range and/or initial energy efficiency of the first vehicle 10a is sufficient for reaching the destination of its itinerary, the data processing unit 52b is configured to calculate an individual energy consumption level for each vehicle for different positions in the fleet and to calculate a fleet average consumption level based on the individual energy consumption level for each vehicle. Further, the data processing unit 52b is configured to select the position of each vehicle based on the individual energy consumption level in relation to the fleet average consumption level.

In various embodiments, the data processing unit 52b is configured to receive destination location, required arrival time, and/or vehicle profile for each vehicle and compare these data of each vehicle with each other. For example, this is done for comparing the itinerary of all vehicles of the group of vehicles.

The term "autonomous" means that the vehicle is performing the movement autarkic, i.e., without intervention of a human, or semi-automatic, i.e., with some human interactions during the movement of the vehicle.

Figure 4:
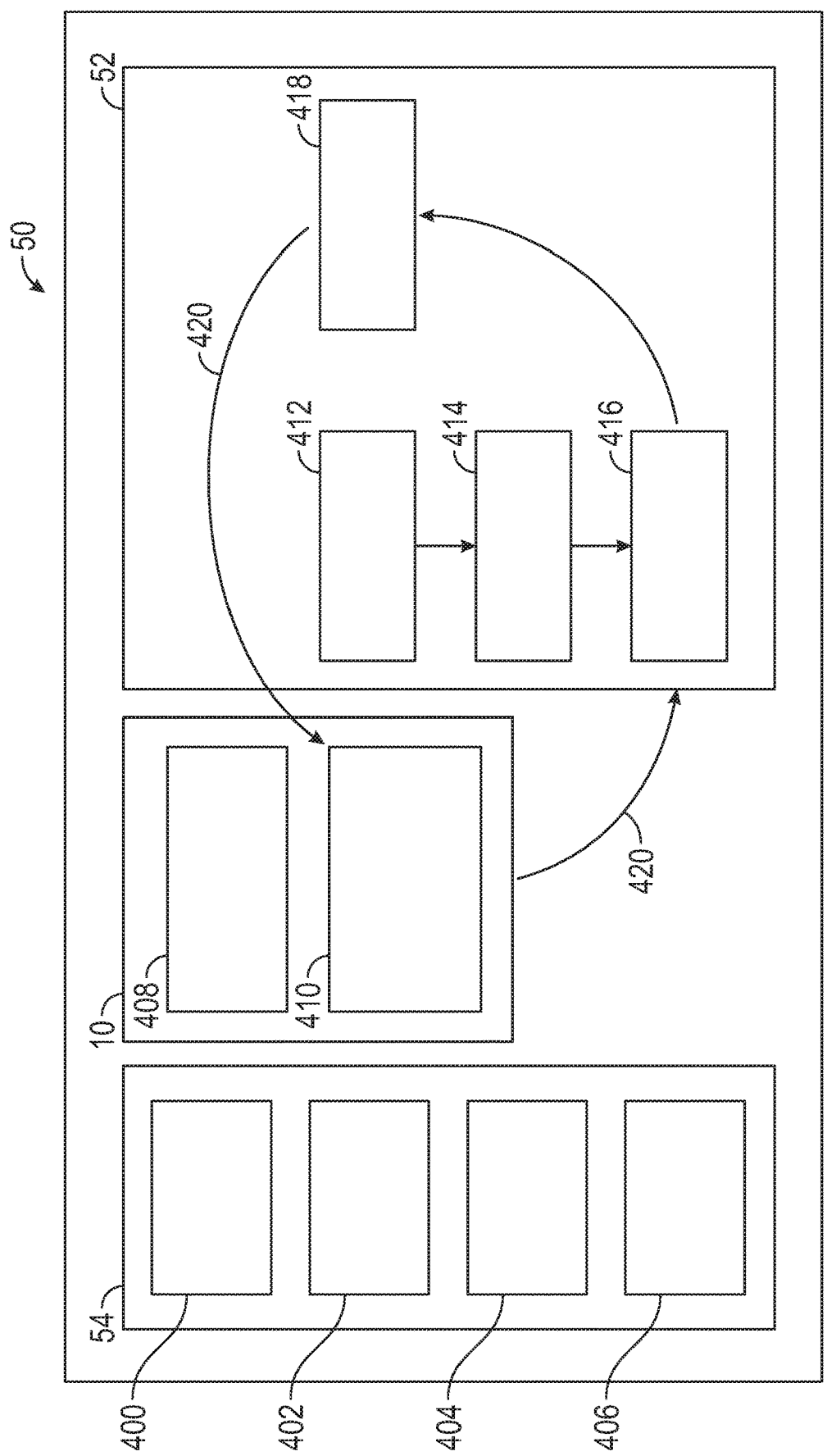
FIG. 4 is a functional block diagram illustrating the functions of a fleet forming system within an operating system, in accordance with an embodiment.

FIG. 4 shows a functional block diagram for illustrating the functions of the fleet forming system 52 within the operating system 50 on a high-level view. Block 400 illustrates, for example, a user defining an itinerary (e.g., destination times and locations, route, etc.).

At block 402, the user defines a value of time ($/minute). For example, the user defines the value of time to destination (i.e., $5/min pre/post deadline). In an example, this means that the user expresses the cost he/she is willing to accept for arriving later than planned at the destination, e.g., the user may set an offer accepting to detour for forming a fleet with the first vehicle, see FIG. 7 and FIG. 8, for example. In another example, the user may set an offer for joining a fleet at a desired position with a fleet driving speed which allows the user to arrive at the destination of the user earlier. This means, for example, that the user may set an offer for joining a fleet travelling at higher speed in order to arrive early at the destination.

At block 404, the user defines a value of energy consumption, including any energy storage limitations and energy remaining objectives ($/gallon, $/L, $/kWh, $/gCO2). The energy efficiency compensation can be also estimated using vehicle profile, trip itinerary, route, powertrain efficiency, etc. In an example, this means that the user expresses the cost the user is willing to accept for a higher energy consumption, e.g., the user may set an offer accepting to move to a less favorable position in the fleet in terms of aerodynamic conditions, see examples shown in FIG. 7 and FIG. 8.

At block 406, the user may optionally define any offsets to the value of energy consumption calculations, i.e., values than pure rational values. The "values other than purely rational" are related to people's objective of having a desire to reduce their "energy footprint" more than pure economics might suggest. For example, energy might cost $0.12/kWh. But, a person willing to reduce its carbon footprint might place an offset on that of an additional 50% (adjusting energy value to $0.18/kWh) to try to drive more personal/fleet energy reduction. The implication in this example is that the person would then be valuing her/his time less, and impacting the fleet optimization equation through this not purely rational value assessment. In one embodiment, the system 52 may also define offsets, like membership discounts, surge pricing, etc.

The term "user" is related to a passenger of the vehicle. The functions at block 402, 404, and 406 may be initialized by using a user interface 54.

The vehicle 10 is exemplary for each of the vehicle of the group of vehicles 10a-10n. The block 408 illustrates a function that the vehicle 10 is configured to communicate that the vehicle 10 is driving on or enters a road. The block 410 illustrates that the vehicle is configured to communicate parameters like the defined value of time and defined energy consumption value to the fleet forming system 52. In addition, the vehicle 10 is configured to communicate travel plans and constraints to the fleet forming system 52.

The energy consumption value can also be referred to as energy efficiency.

The vehicle 10 is adapted to evaluate the energy consumption or energy efficiency depending on different parameters. For example, the vehicle 10 is adapted to determine the energy consumption based on loading of the vehicle (e.g., numbers of passengers in the vehicle), grade/slope, acceleration/deceleration, altitude, temperature and humidity. Moreover, the vehicle 10 is adapted to determine the benefits of driving in a fleet depending on the position in the fleet (e.g., when driving as a leading vehicle or trailing vehicle), the speed of the fleet. Further, the vehicle 10 has knowledge about the vehicle and roadway constraints like speed limits, acceleration limits, deceleration limits etc. As described above, the vehicle 10, illustrated in function 410, communicates these data to the system 52.

The fleet forming system 52 assembles at block 412 the data of the vehicles (e.g., the time and energy value) of each vehicle on the road.

The fleet forming system 52 then optimizes, at block 414, the positions of the vehicles in the fleet (fleet configuration), travel paths, and vehicle speeds to maximize value or minimize cost. The fleet forming system 52 has information about an energy infrastructure, i.e., fuel/charge locations, fuel/charge times, usage predictions. In addition, the fleet forming system 52 has knowledge about roadways, i.e., allowable travel speeds, slopes/grades, signal/stops, parking. Further, the fleet forming system 52 is adapted to determine when a vehicle is changing a fleet, or when a vehicle joins and leaves the fleet.

In a further embodiment, the vehicle is adapted to continuously scan and interface with other vehicles or the coordination system (fleet forming system) to determine if there is a better fleet to join based on individual and societal or fleet benefit. This also means that the vehicle(s) and/or system need to also understand the penalty associated with moving from one fleet to another (potential for both time and energy penalties). By utilizing the value based criteria for compensation of energy and time, the individual/fleet/non-rational benefits are all in agreement.

After optimization at block 414, the fleet forming system communicates, at block 416, to each vehicle willing to form a fleet the instructions to form a fleet (e.g., the time for joining the fleet, the location where to join the fleet, overall travel path, vehicle speed, etc.). Finally, at block 418, the fleet forming system 52 collects and distributes fees for compensation of the vehicles in the fleet, i.e., funds/credits/ and/or other compensation than based on value. By this, the fleet forming system 52 implements a compensation methodology by distributing funds based on relative benefit for each vehicle of a group of vehicles of joining and/or forming a fleet.

Figure 5A:
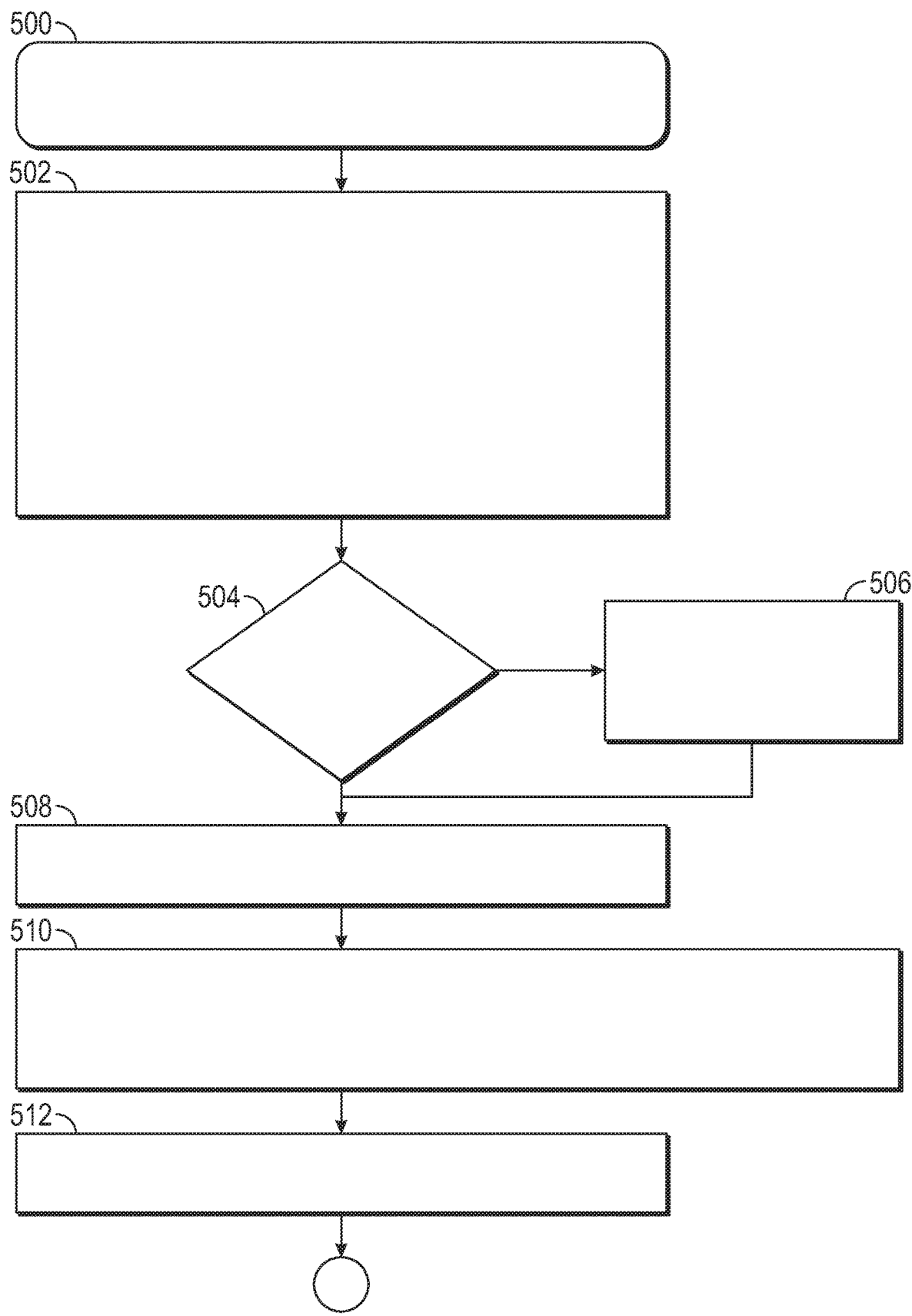
FIGS. 5A-D show flowcharts illustrating forming a fleet or positioning vehicles in the fleet, in accordance with an embodiment.
Figure 5B:
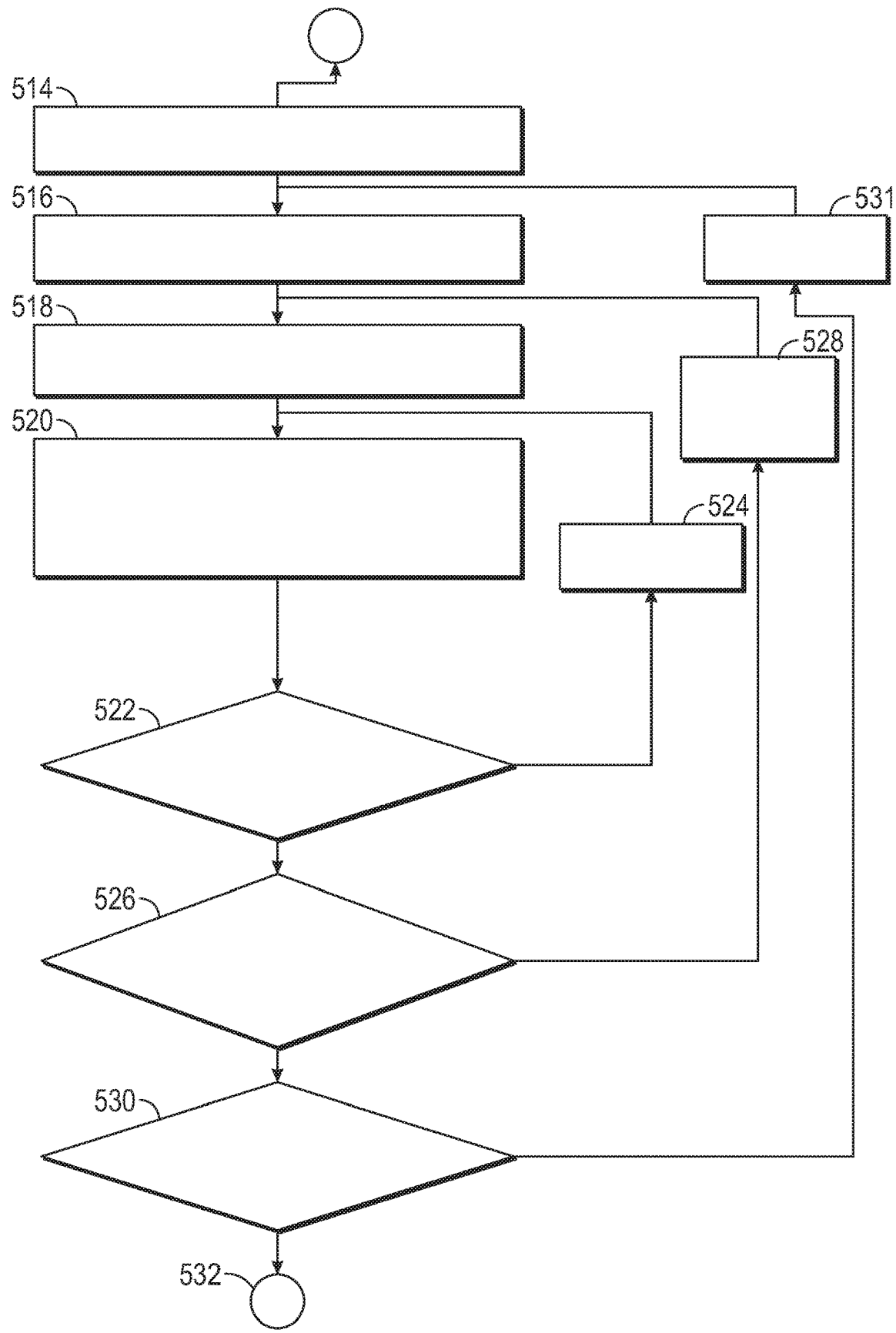
Figure 5C:
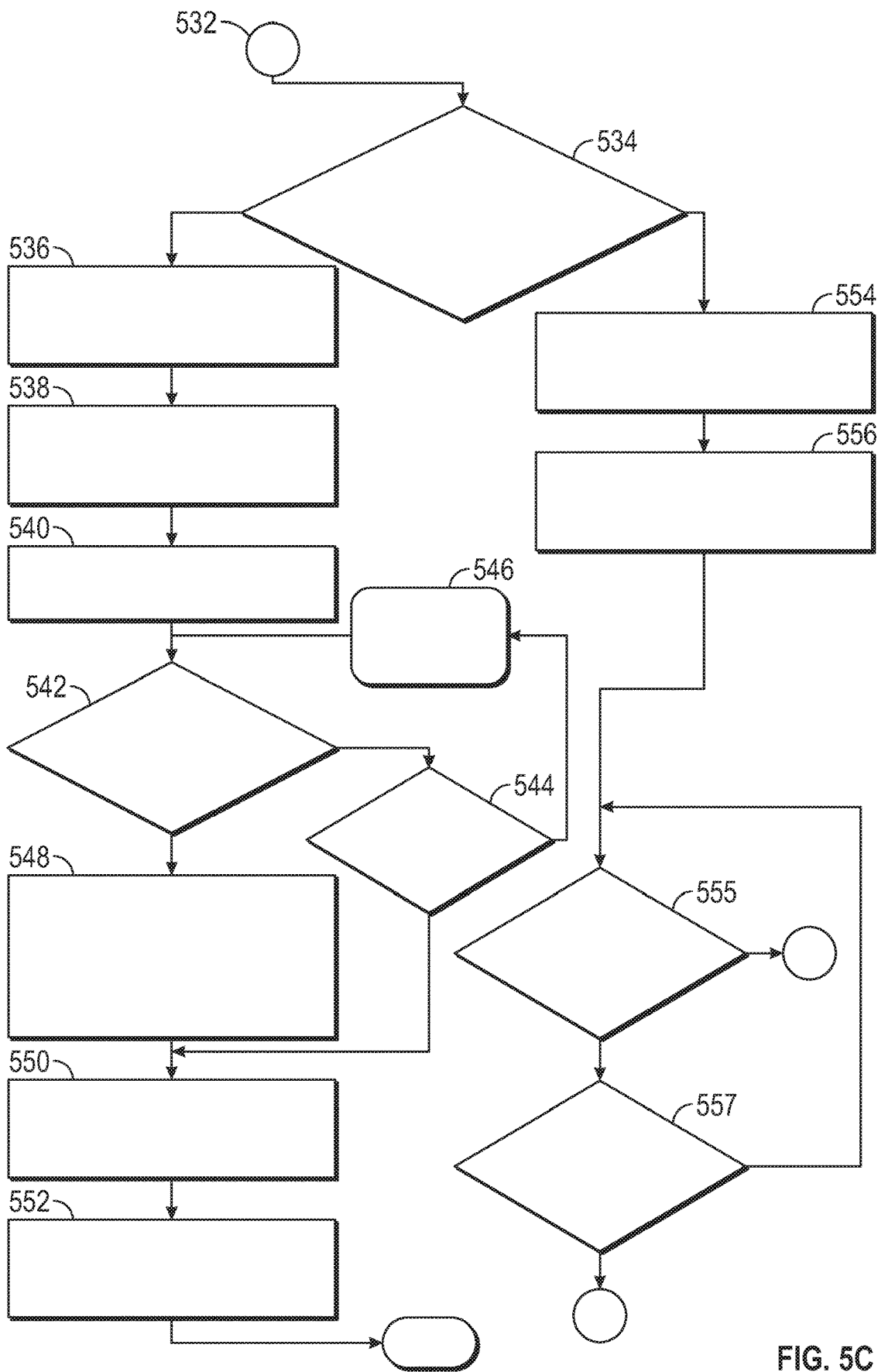

The arrow 420 signifies that the fleet forming system 52 is configured to form a fleet in a dynamic process, i.e., that the fleet forming system 52 is open for any change in the fleet, either by vehicles leaving the fleet, or vehicles changing their objectives or vehicles initiating a request to join the fleet (e.g., with reference to blocks 555 and 557 in FIG. 5C). In addition, the vehicles may offer, counter-bid or decline fees for compensation (e.g., with reference to FIG. 8). Further, the vehicles may opt for either fastest, least expensive, cost-time optimized or most efficient trip in terms of efficiency. This means, for example, that a first vehicle by offering a compensation to a second vehicle and other vehicles may optimize its trip either from a time saving perspective, or from cost saving/energy consumption saving, etc., (e.g., examples provided with reference to FIG. 7 and FIG. 8).

In other words, the system 52 is an incentive based platform enabling connected autonomous vehicles travelling in the fleet by offering compensation to other nearby vehicles to improve individual energy efficiency, individual driving range and/or fleet energy efficiency. A user or vehicle connected to fleet benefits from an increased energy efficiency, increased driving range, reduced operating cost and increased revenue. The system further has the effect that traffic congestions can be reduced, and the utilization of available transportation resources is optimized.

FIG. 5A shows a flowchart illustrating an exemplary process of the fleet forming system 52 surveying route options to build a list of potential fleets that share the same or partially the same itinerary.

At block 500, the user defines an itinerary as already described with reference to FIG. 4.

At block 502, the time value (e.g., $/minute) is determined by the user. This signifies a cost of time. In an example, the user defines this value during a vehicle setup/trip initialization. In another example the time value is estimated based on a user profile and the calendar of the user profile. Further, the energy consumption value is determined (e.g., $/gallon, $/L$/kWh, $/gCO2) for the vehicle (also referred to as connected autonomous vehicle, CAV). In an example the vehicle 10 estimates this value based on the energy storage limitations and energy remaining objectives as described with reference to FIG. 4. The time compensation value can be either user-defined or estimated by the system 52. The time compensation may be estimated using user history of accepted time compensation offers or event/itinerary items. For example, user may be willing to accept a lower time value if trip extension allows them to complete the movie/game they might be watching during the trip. Similarly, their time compensation may be high if they need to reach their destination to catch a flight. Since the system 52 may have access to user profile, contacts and calendars, it can determine the optimum value to compensate the user for an increase in travel time. User profile can also include compensation history, for example, system 52 can use previous user accepted time compensation offers along to show the best compensation offer to the user. The cost of time can be resource based, i.e., the pure value of the user's time (e.g., $1/min or $2/min . . . ) and/or event based. For example, event-based cost of time occurs when a person wants to arrive at a destination 5 min early or wants to catch a flight and will put a premium on that. In an example, this time setting can be managed by the person when entering her/his trip goals, i.e., destination, target time of arrival, equivalent value arrival time window (i.e.; 10 min before has equal value to target time) and penalty/value of being outside that target arrival time window (e.g., 5 min later equal to $10 loss in value, 10 min later equal to $20 loss in value, 30 min later equal to $200 loss in value, 5 min early equal to $5 gain in value, 10 min early equal to $8 gain in value).

At block 504, the fleet forming system 52 receives the different objectives in terms of time value and energy consumption value and other parameters from the users and determines if there is more than one user having different objectives. If yes, at block 506, the fleet forming system 52 or the vehicle (also referred to as connected autonomous vehicle, CAV) determines, for example, an average travel time value for providing user compensation. If no, at block 508, the first vehicle 10a initiates a request to join the fleet forming system 52, which may be referred to as Intelligent Transport System (ITS).

The fleet forming system 52 is configured to access, illustrated by block 510, the destination location, the required arrival time, sensor data and vehicle profile. This may be a temporary trip-specific permission. The data access is exemplarily but not limited to a vehicle speed, available fuel/range ratio, an overview of pedal positions, an aerodynamic profile, an average energy consumption of a vehicle, an acceleration profile of a vehicle.

Next, at block 512, the fleet forming system 52 surveys route options to build a fleet with vehicles that share same or partially same itinerary. In one example, the fleet forming system 52 may send an offer to vehicles to form a fleet with a first vehicle sharing the same or partially the same itinerary. The fleet forming system 52 assembles the requests of vehicles having initiated a request to form a fleet and sharing the same route and each of the defined values in terms of time and energy consumption value from each of the vehicles sharing the same route. As a result, the fleet forming system 52 consolidate a list of vehicles that may form a potential fleet.

FIG. 5B illustrates a further exemplary flow chart for determining positions of vehicles in the fleet. FIG. 5B may be a continuation of the flow chart in FIG. 5A, with the transition point indicated with 'A.' At block 514, the fleet forming system 52 is configured to select a first fleet. At block 516, the system 52 selects a first potential configuration of the vehicles within the first fleet, i.e., the position of each of the group of vehicles joining the first fleet and selects a first vehicle of the first potential configuration at block 518.

At block 520, the fleet forming system 52 calculates the energy consumption value, the required range, a travel time, operating costs and operating values, a trip and route profile, an expected traffic, etc. for the first vehicle. An overall cost value may be calculated by adding a cost for energy, and the cost of time, and other costs (e.g., operating and non-operating costs, infrastructure costs, tolls, maintenance costs, ITS system fees, etc.) as described with reference to FIG. 4. The energy cost may be calculated by the integral of several parameters, like a grade profile of the first vehicle on its route, a speed of the fleet the first vehicle joined, the acceleration profile of the first vehicle, the position of the first vehicle in the fleet (e.g., lead vehicle), etc. For assessing the value for the first vehicle joining a fleet and its potential position in the fleet, the system 52 calculates an overall value comparing the cost in a baseline configuration and the cost in a scenario configuration. The baseline configuration may be the first potential configuration and a first position of the first vehicle respectively. The scenario configuration may be a different fleet configuration and a different position of the first vehicle respectively. By result, the overall value can determine the best position for the first vehicle in the fleet.

At block 522, the system 52 determines if this is the last vehicle of the first fleet, and if no, selects the next vehicle at block 524 and re-performs the calculation at block 520. If yes, the fleet forming system 52 determines, at block 526, if there can be other configurations within the first fleet by re-arranging vehicle positions and, if yes, select a second fleet illustrated by block 528. If no, the fleet forming system 52 determines if there is any other fleet sharing same or partially same itinerary. If yes, illustrated by block 531, the fleet forming system 52 selects a next available fleet and starts the flow chart process again with block 516. If no, the first fleet is selected illustrated by block 532.

Figure 5D:
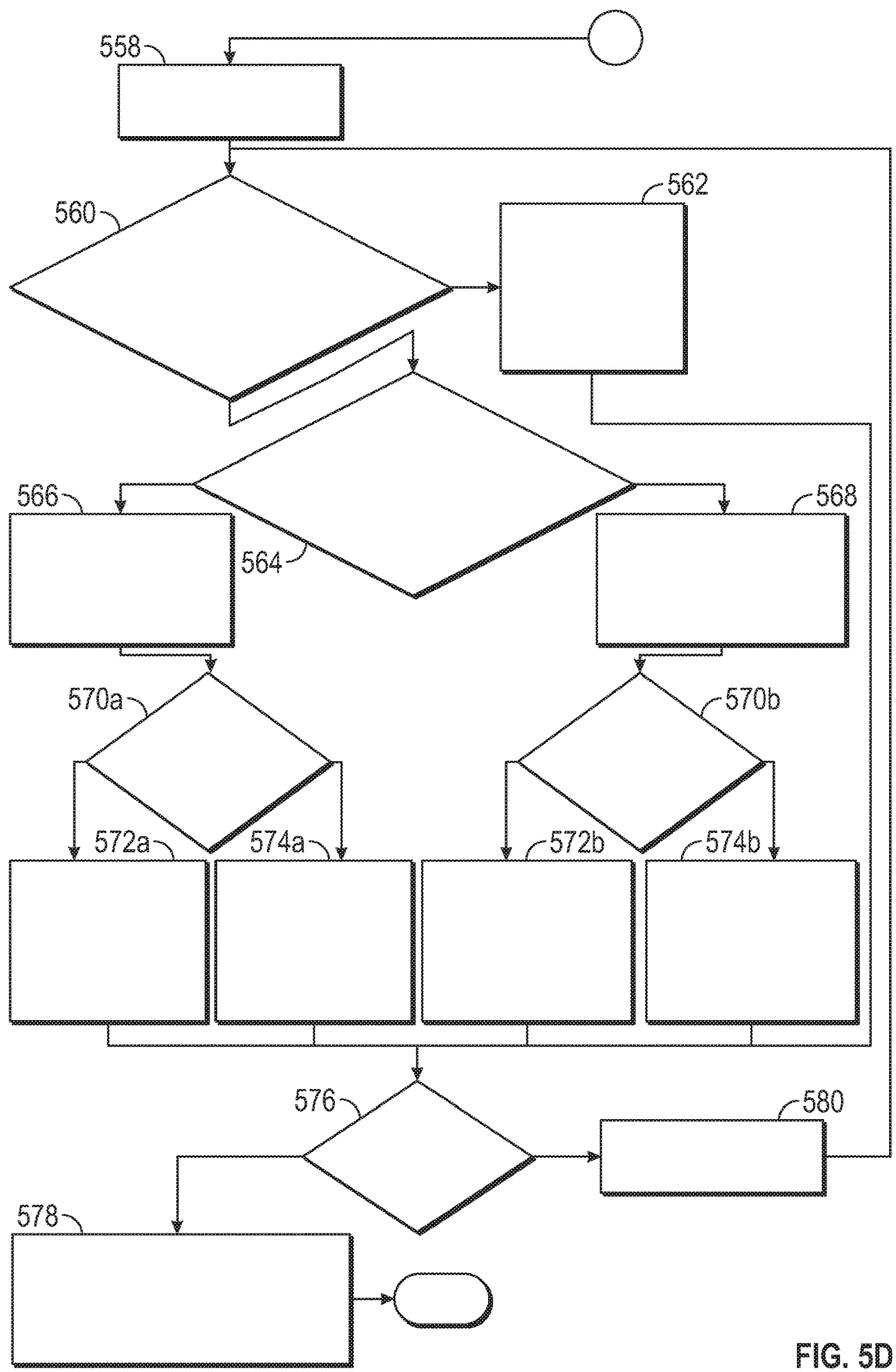

FIG. 5C and FIG. 5D show a further flow chart for exemplarily illustrating the principle of forming a fleet based on a compensation offer principle.

At block 532, the first fleet is selected, which is also the starting point of FIG. 5C. In another example, block 532 can also illustrate a starting point for a group of vehicles in the process of forming a fleet, i.e., a fleet does not yet exist.

At block 534, it is exemplarily illustrated, that the fleet forming system is determining if the range of the first vehicle 10a without joining the fleet is sufficient to meet the required range of the first vehicle 10a.

If no, the fleet forming system 52 calculates at block 536 a compensation offer, i.e., a fleet operating fee (e.g., energy cost value as described above) to be paid by the first vehicle to vehicles accepting to take a position in the fleet which is less favorable in terms of aerodynamic conditions.

In addition, at block 538, the system 52 calculates an additional compensation offer, e.g., a surcharge if the first vehicle proposes a new a route which is increasing the travel time and/or travel costs for the other vehicles in the fleet to be paid to the vehicles tin the fleet accepting to form a fleet although this may be less favorable in terms of travel time. By this, the first vehicle reduces its energy consumption by joining the fleet and paying a compensation for it to the other vehicles of the fleet.

At block 540, if there is more than one fleet, the first vehicle can join, the fleet forming system 52 ranks the fleets based on a total fee, i.e., a fee based on the fleet operating fee and the surcharge.

In an example, at block 542, the fleet forming system 52, determines if the first vehicle and the other vehicles agree on using an estimated fixed fee for the compensation offer.

Figure 8:
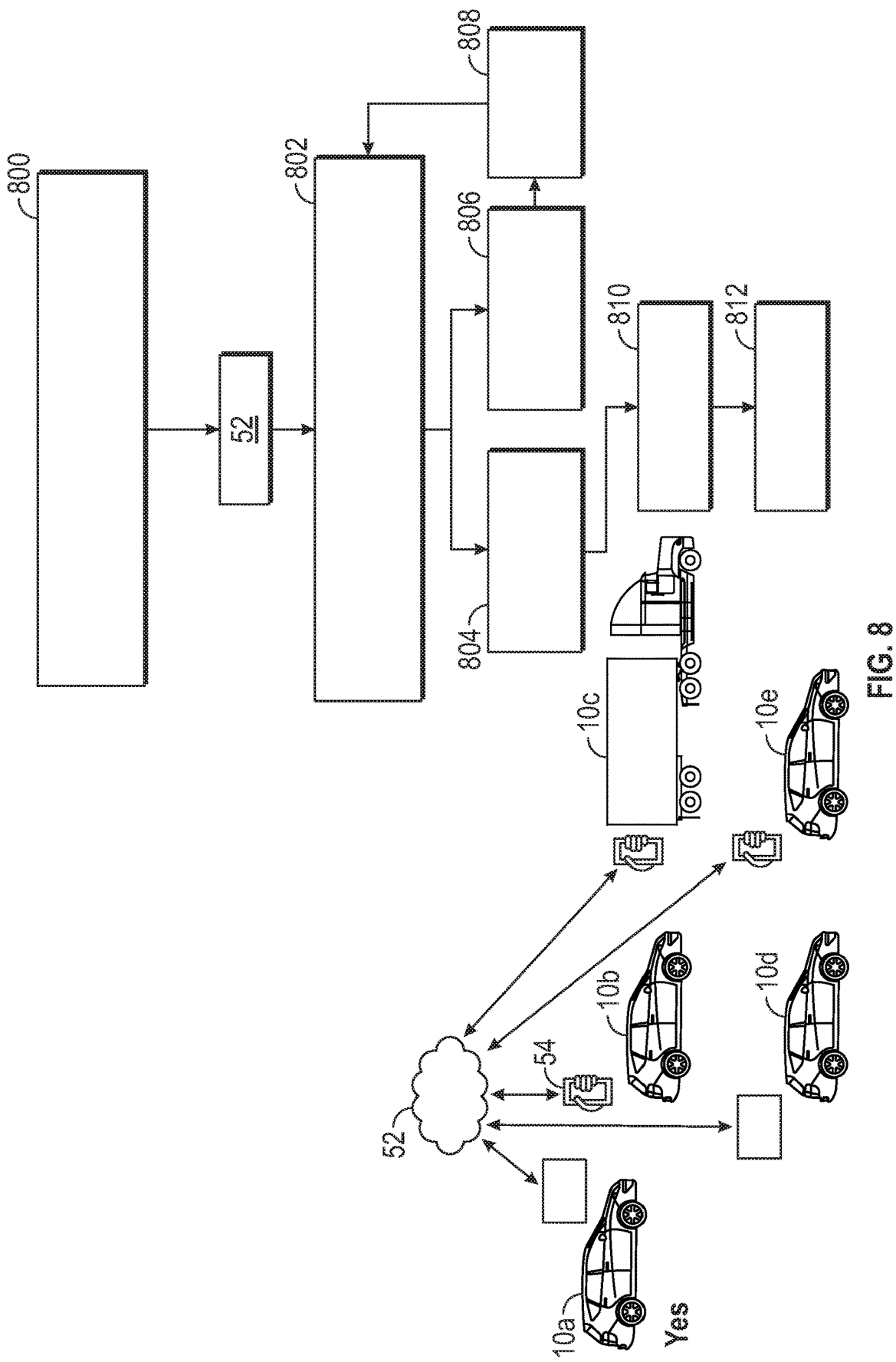
FIG. 8 illustrates a further example of vehicles forming a fleet.

If yes, at block 544, the system determines if the first vehicle 10a agrees on paying the estimated fixed fee. If no, the system 52 moves, at block 546, to a next fleet configuration of the fleet and starts again at block 542. If, at block 542, the system 52 determines that the first vehicles and the other vehicles do not agree to use the estimated fixed fee, then, at block 548, the system 52 determines if other fleets want to join an auction and use the estimated fixed fee as a starting point. The system 52 manages the auction and notifies every one of the results. With reference to FIG. 8, the principle of the auction is further described.

At block 550, if either the first vehicle accepts at block 544 using the estimated fixed fee or another fleet find an agreement with the first vehicle at block 548, then the system 52 informs the positions of each vehicle in the fleet to the first vehicle and the other vehicles in the fleet.

At block 552, the system 52 collects all fees from the users/vehicles of the fleet and distributes the compensation to the vehicles of the fleet having a right to receive compensation.

Referring now back to block 534, if the system determines that the range of the first vehicle 10a without joining the fleet is sufficient to meet the required range of the first vehicle, the system 52 selects then, at block 554, a fleet configuration with the joining first vehicle that shows largest improvement of an overall value for energy consumption value and time value for the fleet. The objective is to select a fleet configuration based on the best energy efficiency value rather than selecting a fleet configuration based on increasing the energy efficiency value of the first vehicle as illustrated at the blocks 536 and following until block 552.

At block 556, the system communicates the fleet configuration based on block 554 and the route of the fleet to the first vehicle and the other vehicles of the fleet.

At block 555, the fleet forming system 52, determines if any one of the vehicles in the fleet reach their destination. If no, the fleet forming system 52 determines, at block 557, if there are any other requests from another vehicle to join the fleet, and if no, the fleet forming system 52 goes back to block 555. This illustrates the dynamic processing of the fleet forming system 52 already described in FIG. 4, i.e., the fleet forming system is configured to determine if there are changes in the fleet and if there are other potential vehicles willing to join the fleet. The fleet forming system 52 may be configured to do this in a repetitive or iterative manner, e.g., in cycles of few seconds to few minutes, for example every second or every three to five seconds up to one or two minutes, depending on the specific scenario.

Referring now to FIG. 5D, the system 52, at block 558, selects the first vehicle in the fleet configuration based on block 554.

At block 560, the system 52 determines, for example, if the energy consumption value of the first vehicle is equal than a fleet average energy consumption value. The fleet average energy consumption value is calculated based on the individual energy consumption value of each vehicle of the fleet configuration based on block 556. If yes, at block 562, the system 52 adds the selected first vehicle to a pool of vehicles who may not receive a compensation. If no, at block 564, the system 52 determines if the energy consumption value of the first vehicle is more than a fleet average energy consumption value. If yes, the system 52, at block 566, adds the first vehicle to the pool of vehicles of the fleet contributing to the compensation offer, i.e., funds. If no, the system 52, at block 568, adds the first vehicle to the pool of vehicles of the fleet receiving compensation from the funds.

After block 566, the fleet forming system determines, at block 570a, if the selected vehicle is enrolled in a membership program. If no, at block 572a, a non-member level fee is charged additionally, which may be calculated in relation to a difference between individual and fleet average energy consumption values. If yes, at block 574a, a member level fee is charged additionally, which may be calculated in relation to a difference between individual and fleet average energy consumption values.

After block 568, the fleet forming system determines, at block 570b, if the selected vehicle is enrolled in a membership program. If no, at block 572b, a non-member level fee is assigned additionally, which may be calculated in relation to a difference between individual and fleet average energy consumption values. If yes, at block 574a, a member level fee is assigned additionally, which may be calculated in relation to a difference between individual and fleet average energy consumption values.

At block 576, the system 52 determines if the first vehicle is the last vehicle in the fleet, and if not, at block 580, selects the next vehicle in the fleet, at block, and starting again the processing steps at block 560 as done for the first vehicle in the fleet. If the system 52, at blocks 570a and 570b, determines that the last vehicle is selected, then, at block 578, the system 52 deducts a fee for compensation based on an agreed fleet configuration of the vehicles in the fleet and assembles the fees from the pool of vehicles contributing to the funds and redistribute the funds to the pool of vehicles receiving a compensation from the funds FIG. 6A to FIG. 6C illustrates some exemplarily constellations of forming a fleet with three vehicles 10a, 10b, 10c.

FIG. 6A shows a vehicle 10a with a range that is not matching the required range, for example to reach the next charging station, and hence may be willing to pay high fee/compensation to join a fleet in order to improve its energy efficiency. The vehicles 10b and 10c are joined in an existing fleet or in the process to form a fleet. The vehicle 10a initiates a request to join the fleet and to be positioned at a position in the fleet with a lower energy consumption level in order to increase its range. The system 52 deducts a compensation offer for this request. Vehicle 10b accepts the offer and vehicle 10a is positioned at the second position between 10b and 10c. Vehicle 10c stays at the last position of the fleet. The vehicle 10c receives no compensation as the integration of vehicle 10a has no effect on vehicle 10c, as vehicle 10c is still the last vehicle. In other words, vehicle 10b gets a compensation for accepting to be a lead vehicle in the fleet. Vehicle 10c may have also received compensation from vehicle 10b for forming the existing fleet.

FIG. 6B shows the vehicles 10a, 10b and 10c driving in an existing fleet. In this constellation, vehicle 10a is leading the existing fleet and initiates a request to change the leading position in its fleet to a position behind the vehicle 10b. For example, vehicle 10a changed its plan and wants to drive to a new destination which is farther but the range of vehicle 10a is not sufficient to reach the new destination. The vehicle 10b accepts a compensation offer from vehicle 10a, and vehicle 10a and 10b change their positions.

FIG. 6C shows the vehicles 10a, 10b, and 10c driving in an existing fleet. In this example, vehicle 10a initiates a request, if vehicle 10b and vehicle 10c are willing to change their itinerary or increase their travel time. Vehicle 10a proposes a compensation offer for vehicle 10b and vehicle 10c for detouring. Vehicle 10b and 10c accepts the compensation offer of vehicle 10a for detouring and stay in the same configuration. In a further example that is not shown, vehicle 10a could additionally propose a compensation offer as described with reference to FIG. 6B.

Figure 7:
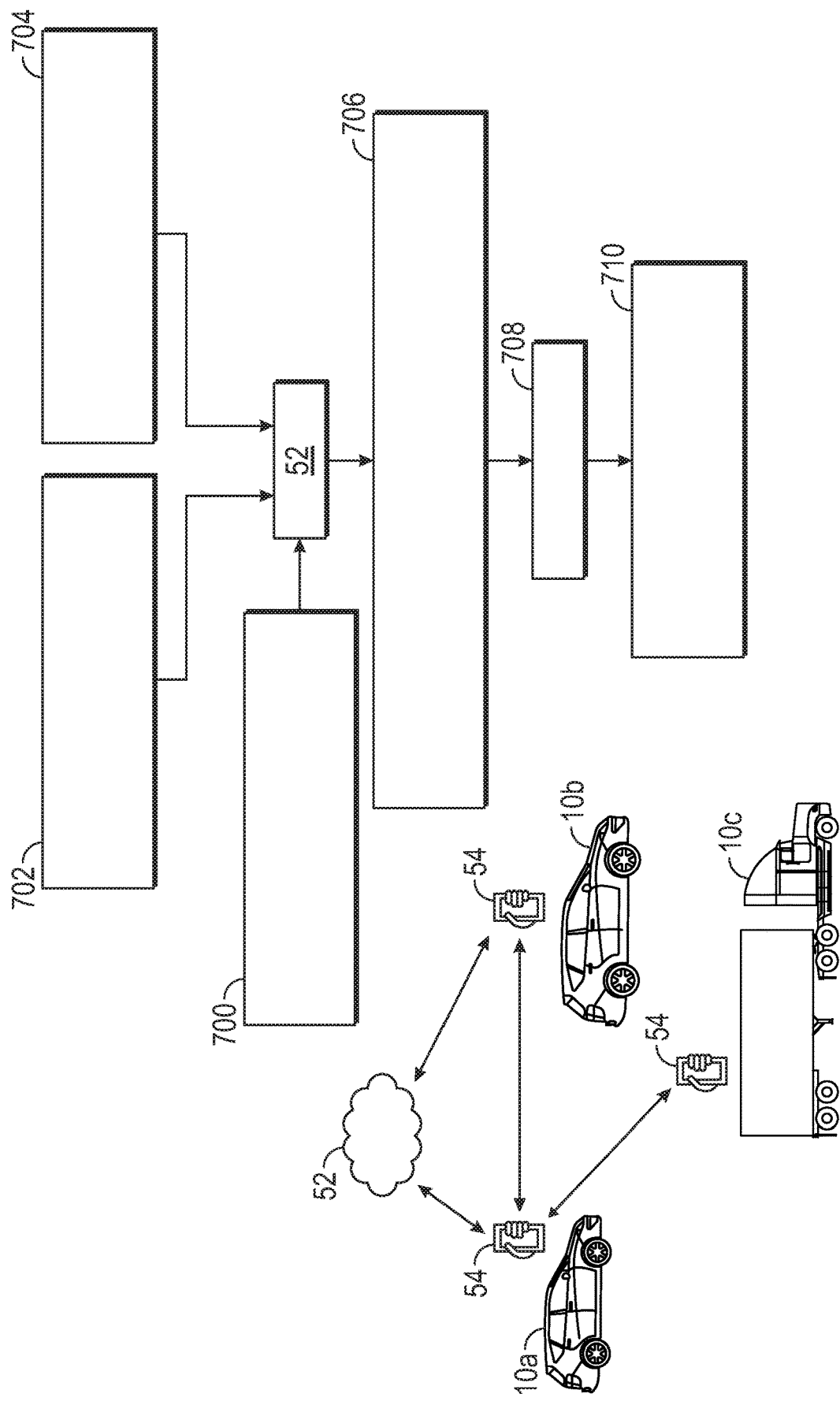
FIG. 7 illustrates another example of vehicles forming a fleet.

FIG. 7 shows an example of a vehicle 10a with variable or mileage-based compensation and corresponding flowchart for forming a fleet with vehicle 10b and/or 10c. In this example, vehicle 10a informs the system 52 with the user interface 54 that it wants to join a fleet. The vehicle 10a is ready to offer a compensation and communicates it to the system, e.g., vehicle 10a is ready to pay up to $0.1/mile for next 60 highway miles (block 700) or, alternatively, the system 52 is proposing a compensation offer to the vehicle 10a to be paid to the vehicles 10b and 10c. Vehicle 10b informs also the system 52 that it wants to form a fleet, e.g. for next 50 highway miles followed by 20 miles in the city (block 702). Vehicle 10c is a truck and informs the system 52 to form a fleet, e.g., by defining a compensation for forming a fleet and being the lead vehicle, for example, $0.08/mile for next 70 highway miles (block 704). The system 52 forwards the request from vehicle 10a to both vehicle 10b and vehicle 10c and suggests a fee for a compensation offer based on the energy efficiency gain/loss for each vehicle 10b and 10c (block 706). Then, the vehicle 10c accepts the compensation offer (block 708). In a not shown example, vehicle 10c may not accept the suggested fee and propose another fee for compensation. Vehicle 10b does not accept the suggested fee and does not join the fleet. Vehicle 10a joins vehicle 10c and initiates a payment to the system 52 based on the suggested fee. At the end of the trip, the system 52 initiates a payment to vehicle 10c (block 710). In this example, vehicle 10a may pay more to the truck 10c than to the vehicle 10b as it gets larger energy benefit by forming a fleet with the truck 10c.

FIG. 8 shows an example of a vehicle 10a and corresponding flowchart for forming a fleet with a group of vehicles 10b-10e.

In this example, the vehicle 10a has a range, e.g., 55 miles, that is not sufficient for reaching its destination. For example, the nearest charging/refueling station is at 60 miles so that the vehicle 10a does not reach the station with the existing range of 55 miles (block 800). Therefore, the vehicle 10a initiates a request to join a fleet via the user interface 54 (e.g., via an application installed on a smartphone or vehicle infotainment system app; the vehicle infotainment system is indicated with 'GPS' in FIG. 8 while it may be any suitable human machine interface that is configured to receive a user input) to the system 52. The system 52 is configured to determine at least a second vehicle to form a fleet. The system 52, as described with reference to FIG. 4 to FIG. 6, is configured to determine a position of the first vehicle in the fleet with less energy consumption in order to increase its range. In other examples, the system 52 may determine a fleet with vehicle 10a which optimizes the trip of vehicle 10a in terms of vehicle speed, etc., as also described with reference to FIG. 4 to FIG. 6. The system 52 is configured to calculate and offer a fee, e.g., $4+0.05/mile, for compensation to a first existing fleet, e.g., consisting of vehicle 10b and vehicle 10c for joining the fleet at a position with less energy consumption (block 804). In parallel, the system 52 is configured to calculate and offer a fee for compensation to a second existing fleet, e.g., consisting of vehicle 10d and vehicle 10e (block 806), e.g., $4+0.03/mile. The second existing fleet may counterbid the fee proposed by the system 52 (block 808), the system 52 may determine a new fee based on the counter-bid of the second existing fleet. The system 52 may communicate the counter-bid fee of the existing second fleet to the first vehicle 10a. Hence, the system 52 is configured to start an auction between vehicles or existing fleets in order to find an agreement between vehicles and existing fleets to form a fleet. By this, the vehicle 10a can select out of different fees for the compensation. In this example, the first existing fleet accepts the offer from vehicle 10a (block 810) and vehicle 10a joins the first existing fleet and initiates a payment (block 812) to the system 52. As a result, the range-constrained vehicle 10a could join a fleet so that it can reach the next charging station.

Figure 9:
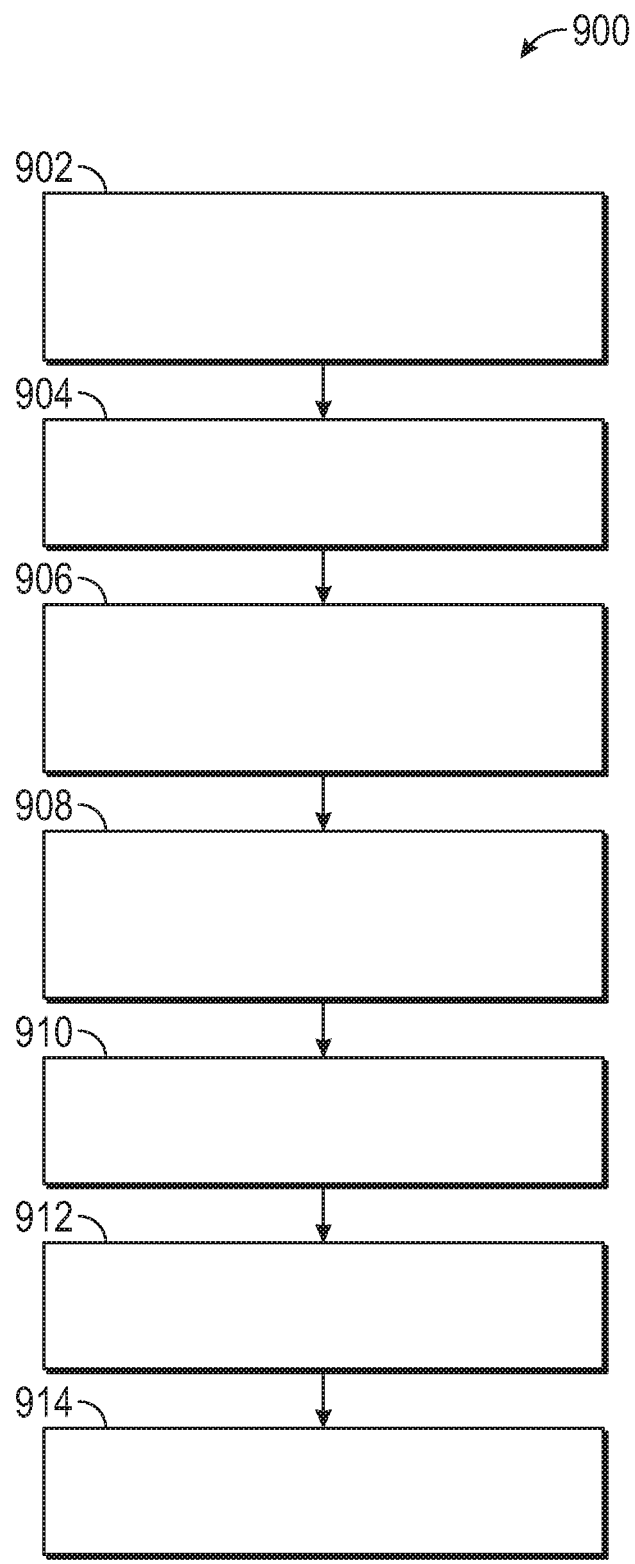
FIG. 9 shows a method for forming a fleet.

FIG. 9 shows a method 900 for forming a fleet and positioning vehicles in the fleet, the method comprising the following steps: At step 902, determining an itinerary of each of a group of vehicles having initiated a request to join a fleet. At step, 904 comparing the itinerary of all vehicles of the group of vehicles. At step 906, determining a second vehicle to form a fleet with a first vehicle from the group of vehicles. At step 908, communicating to the first vehicle a proposal to form a fleet with the second vehicle. At step 910, determining if the first vehicle accepts the proposal and if yes, at step 912, then determining instructions for the first vehicle how to join the fleet. At 914, communicating the instructions how to join the fleet to the first vehicle.

The method 900 may comprise steps which correspond to the functions described with reference to FIG. 4 to FIG. 8. It is noted that the steps of the method described herein may be executed by a processor, for example by the processor 44 referred to in FIG. 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for forming a fleet and positioning vehicles in the fleet, the system comprising:
   a data transmission interface;

a data processing unit, configured to send data to and receive data from the data transmission interface;

wherein the data processing unit is configured to determine an itinerary of each of a group of vehicles having initiated a request to join a fleet;

wherein the data processing unit is configured to compare the itinerary of all vehicles of the group of vehicles;

wherein the data processing unit is configured to determine a second vehicle to form a fleet with a first vehicle from the group of vehicles;

wherein the data transmission interface is configured to communicate to the first vehicle a proposal to form a fleet with the second vehicle;

wherein the data processing unit is configured to determine if the first vehicle accepts the proposal; and if yes, then determine instructions for the first vehicle how to join the fleet; and wherein the data transmission interface is configured to communicate the instructions how to join the fleet to the first vehicle.

2. The system of claim 1, wherein the data processing unit is configured to
determine the second vehicle based on a same or partially same itinerary within a predetermined timeframe.

3. The system of claim 1, wherein the data processing unit is configured to:
determine a starting point for the first vehicle where to join the fleet; and
determine a time for the first vehicle when to join the fleet.

4. The system of claim 1, wherein the data processing unit is configured to
determine a position for the first vehicle in the fleet.

5. The system of claim 1, wherein the data processing unit is configured to:
determine the number of vehicles in the fleet;
determine a position for each vehicle in the fleet; and
wherein the data transmission interface is configured to communicate, to each vehicle, its position in the fleet.

6. The system of claim 4, wherein the data processing unit, for determining a position for the first vehicle in the fleet, is configured to:
determine an initial range and/or an initial energy efficiency of the first vehicle without joining the fleet;
calculate a new range and/or a new energy efficiency of the first vehicle for different positions of the first vehicle in the fleet;
calculate a new range and or a new energy efficiency for each one of the other vehicles for different positions of the first vehicle in the fleet; and
determine if the initial range and/or the initial energy efficiency of the first vehicle is sufficient for reaching a destination of its itinerary, and if not, then indicate a position of the first vehicle in the fleet with less energy consumption than without joining the fleet in order to increase the range of the first vehicle.

7. The system of claim 6, wherein the data processing unit is configured to request an amount of compensation from the first vehicle in order to be positioned at the indicated position;
wherein the data transmission interface is configured to communicate a compensation offer to at least one of the other vehicles at a position with higher energy consumption; and
wherein the data processing unit is configured to determine if the at least one vehicle of the other vehicles accepts the offer; and if yes, the data processing unit is configured to then initiate a compensation from the first vehicle to the at least one of the other vehicles based on the compensation offer.

8. The system of claim 7, wherein if the at least one vehicle of the other vehicles does not accept the offer,
the data processing unit is configured to then determine a third vehicle with an itinerary different from the itinerary of the first vehicle;
the data transmission interface is configured to then communicate to the first vehicle a proposal to form a fleet with the third vehicle; and to
communicate to the third vehicle a proposal to form a fleet with the first vehicle;
wherein the data processing unit is configured to request an amount of compensation from the first vehicle in order to form a fleet with the third vehicle; and to
determine if the third vehicle accepts the offer; and if yes, then
is configured to determine instructions for the first vehicle and the third vehicle how to form the fleet;
wherein the data transmission interface is configured to communicate the instructions how to form the fleet to the first vehicle and the third vehicle.

9. The system of claim 6, wherein, if the initial range of the first vehicle is sufficient for reaching the destination of its itinerary, the data processing unit is configured to:
calculate an individual energy consumption level for each vehicle for different positions in the fleet;
calculate a fleet average consumption level based on the individual energy consumption level for each vehicle; and
select the position of each vehicle based on the individual energy consumption level in relation to the fleet average consumption level.

10. The system of claim 1, wherein the data processing unit, for comparing the itinerary of all vehicles of the group of vehicles, is configured to:
receive destination location, required arrival time, and/or vehicle profile for each vehicle; and
compare these data of each vehicle with each other.

11. A method for forming a fleet and positioning vehicles in the fleet, the method comprising the following steps:
determining, by a processor, an itinerary of each of a group of vehicles having initiated a request to join a fleet;
comparing, by a processor, the itinerary of all vehicles of the group of vehicles;
determining, by a processor, a second vehicle to form a fleet with a first vehicle from the group of vehicles;
communicating to the first vehicle a proposal to form a fleet with the second vehicle;
determining, by a processor, if the first vehicle accepts the proposal; if yes, then
determining, by a processor, instructions for the first vehicle how to join the fleet; and
communicating the instructions how to join the fleet to the first vehicle.

12. The method of claim 11, wherein the step determining a second vehicle to form a fleet with the first vehicle comprises
determining a second vehicle with same or partially same itinerary within a predetermined timeframe.

13. The method of claim 11, wherein the step determining instructions for the first vehicle how to join the fleet comprises:
determining a starting point for the first vehicle where to join the fleet; and determining a time for the first vehicle when to join the fleet.

14. The method of claim 11, wherein the step determining instructions for the first vehicle how to join the fleet comprises
    determining a position for the first vehicle in the fleet.

15. The method of claim 11,
    wherein the step determining instructions for the first vehicle how to join the fleet comprises:
    determining, by a processor, the number of vehicles in the fleet; and
    determining, by a processor, a position for each vehicle in the fleet;
    wherein the method further comprises the step communicating, to each vehicle, its position in the fleet.

16. The method of claim 14, wherein the step determining a position for the first vehicle in the fleet comprises:
    determining, by a processor, an initial range and/or an initial energy efficiency of the first vehicle without joining the fleet;
    calculating, by a processor, a new range and/or a new energy efficiency for the first vehicle for different positions of the first vehicle in the fleet;
    calculating, by a processor, a new range and/or a new energy efficiency for each one of the other vehicles for different positions of the first vehicle in the fleet; and
    determining, by a processor, if the initial range and/or the initial energy efficiency of the first vehicle is sufficient for reaching a destination of its itinerary, if not, then
    indicating a position of the first vehicle in the fleet with less energy consumption than without joining the fleet in order to increase the range and/or the energy efficiency of the first vehicle.

17. The method of claim 16, further comprising:
    requesting, by a processor, an amount of compensation from the first vehicle in order to be positioned at the indicated position;
    communicating a compensation offer to at least one of the other vehicles at a position with higher energy consumption;
    determining, by a processor, if the at least one vehicle of the other vehicles accepts the offer; and if yes, then
    initiating, by a processor, a compensation from the first vehicle to the at least one of the other vehicles based on the compensation offer.

18. The method of claim 17, wherein, if the at least one vehicle of the other vehicles does not accept the offer, the method further comprises:
    determining, by a processor, a third vehicle with an itinerary different from the itinerary of the first vehicle;
    communicating to the first vehicle a proposal to form a fleet with the third vehicle;
    communicating to the third vehicle a proposal to form a fleet with the first vehicle;
    requesting, by a processor, an amount of compensation from the first vehicle in order to form a fleet with the third vehicle;
    determining, by a processor, if the third vehicle accepts the offer; and if yes, then
    determining, by a processor, instructions for the first vehicle and the third vehicle how to form the fleet;
    communicating the instructions how to form the fleet to the first vehicle and the third vehicle; and
    forming the fleet with the first vehicle and the third vehicle.

19. The method of claim 16, wherein, if the initial range and/or energy efficiency of the first vehicle is sufficient for reaching the destination of its itinerary, the method further comprises:
    calculating, by a processor, an individual energy consumption level for each vehicle for different positions in the fleet; and
    calculating, by a processor, a fleet average consumption level based on the individual energy consumption level for each vehicle;
    selecting, by a processor, the position of each vehicle based on the individual energy consumption level in relation to the fleet average consumption level.

20. The method of claim 11, wherein the step comparing the itinerary of all vehicles of the group of vehicles comprises:
    receiving destination location, required arrival time, and/or vehicle profile for each vehicle; and
    comparing these data of each vehicle with each other.

* * * * *